United States Patent
Kriegel

(10) Patent No.: US 11,808,238 B2
(45) Date of Patent: Nov. 7, 2023

(54) METHOD FOR PROCESS-INTEGRATED OXYGEN SUPPLY OF A HYDROGEN CIRCULATION ENGINE COMPRISING RECIRCULATION OF A NOBLE GAS

(71) Applicant: Fraunhofer-Gesellschaft zur Foerderung der angewandten Forschung e.V., Munich (DE)

(72) Inventor: Ralf Kriegel, Kahla (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 26 days.

(21) Appl. No.: 17/771,389

(22) PCT Filed: Oct. 23, 2020

(86) PCT No.: PCT/DE2020/100913
§ 371 (c)(1),
(2) Date: Apr. 22, 2022

(87) PCT Pub. No.: WO2021/078333
PCT Pub. Date: Apr. 29, 2021

(65) Prior Publication Data
US 2022/0372936 A1    Nov. 24, 2022

(30) Foreign Application Priority Data

Oct. 25, 2019   (DE) ................... 10 2019 128 882.7

(51) Int. Cl.
*F02M 25/12*   (2006.01)
*F02B 43/12*   (2006.01)
(Continued)

(52) U.S. Cl.
CPC ......... *F02M 25/12* (2013.01); *C01G 49/0072* (2013.01); *F02B 43/12* (2013.01); *F02B 47/10* (2013.01); *F02M 21/0206* (2013.01)

(58) Field of Classification Search
CPC .... F02M 21/02; F02M 21/0206; F02M 25/12; F02B 43/10; F02B 43/12; F02B 47/10;
(Continued)

(56) References Cited

U.S. PATENT DOCUMENTS 3,792,690 A    2/1974   Cooper
4,287,170 A    9/1981   Erickson
(Continued)

FOREIGN PATENT DOCUMENTS

CN    1279627 A      1/2001
CN    101041419 A    9/2007
(Continued)

OTHER PUBLICATIONS

Cech., M., et al., "Zero-emission closed cycle engine for reconversion of green hydrogen," *Dessauer Gasmotoren-Konferenz*, 34 pages (Apr. 11/12, 2019).
(Continued)

*Primary Examiner* — John Kwon
*Assistant Examiner* — Johnny H Hoang
(74) *Attorney, Agent, or Firm* — Christensen, Fonder, Dardi & Herbert PLLC

(57) ABSTRACT

A method for supplying hydrogen-operated internal combustion engines with oxygen, wherein an inert gas is cycled. An economical local supply of pure oxygen for a closed-cycle hydrogen engine with argon cycling is realized by separating the oxygen from the atmosphere without relying on the useful work of the engine. OSM ceramics and exhaust gas heat and low oxygen partial pressure of the exhaust gas are used to generate oxygen. Two reactors filled with OSM
(Continued)

ceramics are used, these reactors being alternately purged with exhaust gas and regenerated with air. Losses of inert gases and the entry of atmospheric nitrogen are avoided by intermediate purging with steam. The steam is generated by the heat of the exhaust gas or exhaust air. A mixture of water vapor, inert gas and oxygen is formed during purging. Subsequently, the oxygen content in the gas phase is markedly increased since water vapor is condensed out.

8 Claims, 1 Drawing Sheet

(51) Int. Cl.
*C01G 49/00* (2006.01)
*F02M 21/02* (2006.01)
*F02B 47/10* (2006.01)

(58) Field of Classification Search
CPC ........ C01B 13/02; C01G 49/00; B01D 53/04; F02G 5/02; F02D 19/02; F02D 21/04; F01N 3/005; F01N 3/043; F01N 3/0205
See application file for complete search history.

(56) References Cited

U.S. PATENT DOCUMENTS

| | | | |
|---|---|---|---|
| 4,411,223 | A | 10/1983 | Kiely |
| 5,954,859 | A | 9/1999 | Keskar et al. |
| 6,379,586 | B1 | 4/2002 | Zeng et al. |
| 9,557,053 | B1 | 1/2017 | Siriwardane et al. |
| 2003/0138747 | A1 | 7/2003 | Zeng et al. |
| 2005/0031522 | A1 | 2/2005 | Delaney et al. |
| 2006/0065214 | A1 | 3/2006 | Flessner et al. |
| 2009/0035192 | A1 | 2/2009 | Hwang |
| 2009/0188476 | A1 | 7/2009 | Sasajima et al. |
| 2015/0122237 | A1* | 5/2015 | Kato ............... F02D 19/02 123/568.11 |
| 2022/0154233 | A1* | 5/2022 | Björklund ............... C13K 1/02 |

FOREIGN PATENT DOCUMENTS

| | | |
|---|---|---|
| CN | 101512125 A | 8/2009 |
| CN | 101837278 A | 9/2010 |
| CN | 104314711 A | 1/2015 |
| CN | 104411946 A | 3/2015 |
| CN | 105189984 A | 12/2015 |
| CN | 105682791 A | 6/2016 |
| CN | 107191288 A | 9/2017 |
| CN | 108291719 A | 7/2018 |
| DE | 38 09 386 A1 | 9/1988 |
| DE | 10 2005 034 071 B4 | 8/2013 |
| EP | 0 913 184 B1 | 5/1999 |
| EP | 3 431 736 A1 | 1/2019 |
| JP | H07-292372 A | 11/1995 |
| JP | H 11-93681 A | 4/1999 |
| JP | 2009-264108 A | 11/2009 |
| WO | WO 2006/037006 A2 | 4/2006 |
| WO | WO 2006/037006 A3 | 4/2006 |
| WO | WO 2014/161531 A2 | 10/2014 |

OTHER PUBLICATIONS

Meriläinen, Arttu, et al., "Minimizing specific energy consumption of oxygen enrichment in polymeric hollow fiber membrane modules," *Applied Energy*, vol. 94, pp. 285-294 (2012).

Rao, Prakash, et al., "Industrial Oxygen: Its Generation and Use," *ACEEE Summer Study on Energy Efficiency in Industry*, pp. 6-124 to 6-135 (2007).

Kriegel, Ralf, "Oxygen delivering ceramics for combustion processes," *gaswärme international*, vol. 4, pp. 43-48 (2017).

Du, Xiao Chun, et al., "Mn-doped ceria-zirconia solid solutions as supports for mixed transition metal-oxides catalysts for methane combustion," China Academic Journal Electronic Publishing House, 4 pages (Jun. 25, 2005).

Cheng, Jin Shu, et al., "Application Analysis of Oxygen-enriched Combustion in Ceramic Roller Kiln," China Academic Journal Electronic Publishing House, 5 pages (Jun. 15, 2010).

Shi, Qiliang, et al., "Experimental Investigation of Chemical Looping Hydrogen Generation Using Iron Oxides as Oxygen Carrier," Proceedings of the CSEE, vol. 31, 7 pages (Dec. 31, 2011).

Jun, Deng, et al., "Experiment on Combustion Characteristics of Natural Gas in Cylinder Under Ar—$O_2$ Atmosphere," Transactions of CSICE, vol. 35, No. 1, 6 pages (Jan. 25, 2017).

* cited by examiner

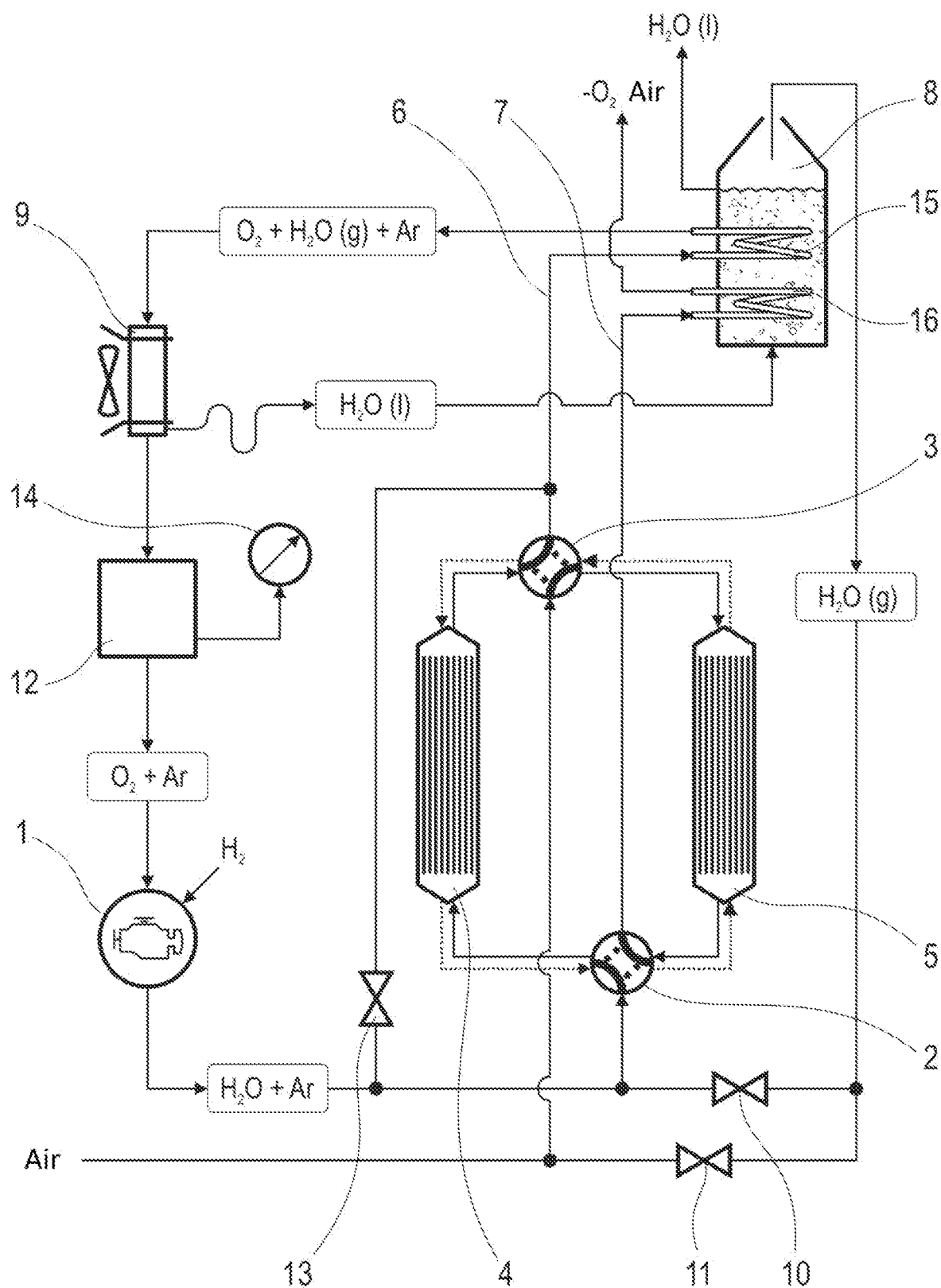

METHOD FOR PROCESS-INTEGRATED OXYGEN SUPPLY OF A HYDROGEN CIRCULATION ENGINE COMPRISING RECIRCULATION OF A NOBLE GAS

PRIORITY CLAIM

The present application is a National Phase entry of PCT Application No. PCT/DE2020/100913, filed Oct. 23, 2020, which claims priority to German Patent Application No. 10 2019 128 882.7, filed Oct. 25, 2019, the disclosures of which are hereby incorporated by reference herein in their entirety.

FIELD OF THE INVENTION

The invention is directed to a method for supplying hydrogen-operated internal combustion engines with oxygen, wherein, further, an inert gas, preferably argon, is cycled.

The invention is based on the objective of using inexpensive internal combustion engines for local energy production or for driving engines and vehicles, but while preventing any $CO_2$ emissions through the use of hydrogen as fuel and, at the same time, appreciably increasing the efficiency of energy conversion.

BACKGROUND OF THE INVENTION

Conventional reciprocating engines burn hydrocarbon-containing fuels in the form of gases or liquids with air as oxidizer gas, which results in an exhaust containing $CO_2$ and $H_2O$. Internal combustion engines without $CO_2$ emissions can only be realized through uneconomical storage of the generated $CO_2$ or by using carbon-free fuels such as hydrogen or $NH_3$, since the latter only emit water vapor or water vapor and nitrogen. However, such fuels have an appreciably different combustion behavior than hydrocarbons. Thus the flame propagation speed in hydrogen is, e.g., appreciably higher than in the common hydrocarbons ($CH_4$/air: ≈40 cm/s).

In hydrogen engines, the combustion proceeds very quickly even with air so that the mechanical loads increase very rapidly during operation. Although an increase in the oxygen content in the oxidizer gas would sharply accelerate the flame propagation, several patents even disclose operation with an oxyhydrogen mixture (DE 38 09 386 A1) or pure hydrogen and oxygen from an upstream electrolyzer (WO 2006/037006 A3), from the reaction of an alkaline earth metal with water (U.S. Pat. No. 4,411,223 A) or from a plasma-chemical conversion (JP H07 292 372 A). The material problems resulting from an unchecked oxyhydrogen reaction are not discussed. A more feasible solution is afforded by cooling the combustion of hydrogen with oxygen by admixture of argon (JP 2009 264 108 A).

After several failed development projects for the hydrogen engine, it has recently been shown by WTZ Roßlau that this latter approach makes possible a closed-cycle internal combustion engine with an appreciably improved efficiency (Cech, M., Ehrler, T., Tschalamoff, T., Knape, M., Reiser, Ch. *Zero Emission-Kreislaufmotor zur Rückverstromung von grünem Wasserstoff* [zero-emission closed-cycle engine for the reconversion of green hydrogen], 11$^{th}$ Dessau Gas Engine Conference, Apr. 11-12, 2019, Dessau). Until now, however, only hydrogen and oxygen from water electrolysis have been used for operating this stationary engine. Accordingly, both gases must always be kept in stock. A broad application of this combustion method would require the storage and distribution of pure oxygen in addition to the hydrogen infrastructure. However, supplying with liquid or compressed gaseous oxygen will not be economical for the foreseeable future, since the price of oxygen rises sharply with decreasing purchase quantity due to the logistical expense. With the low oxygen requirement of small to medium-sized hydrogen engines, an efficient operation with commercially produced oxygen is not economical. The use of oxygen from water electrolysis with the extremely high energy requirement of approximately 8.5 kWh/Nm$^3$ of oxygen is only sensible for stationary applications of hydrogen reconversion in which the required oxygen is already present. It is generally ruled out for an oxygen supply for stationary or mobile internal combustion engines for energy-related and economic reasons.

Therefore, an obvious solution for this set of problems is to produce oxygen directly at the internal combustion engine from air using the energy released by the engine. For this reason, the generation of oxygen at the engine was already disclosed in 1972 in U.S. Pat. No. 3,792,690 A in which all of the methods known at that time for supplying oxygen were mentioned. Instead of cooling the combustion with atmospheric nitrogen as usual, cooling through dilution of the highly reactive oxygen with $CO_2$ taken from the exhaust is suggested in the main patent claim. Accordingly, this approach is geared to the use of carbon-containing fuels.

The technical possibilities for the oxygen supply of a closed-cycle hydrogen engine are based on the usual technical methods for separating oxygen from air. The large number of known separating methods are only suitable for an enrichment of gases with oxygen. Thus oxygen concentrations of up to approximately 40 vol % are achieved with polymer membranes (Meriläinen, A., Seppälä, A., Kauranen, P. *Minimizing specific energy consumption of oxygen enrichment in polymeric hollow fiber membrane modules*, Applied Energy 94 (2012), pp. 285-294) and a maximum of 95 vol % is achieved by pressure swing adsorption on zeolites (Rao, P., Muller, M.: *Industrial Oxygen: Its Generation and Use*, Proceedings of ACEEE Summer Study on Energy Efficiency in Industry (2007), 6-124 to 6-134). Special oxygen-storage materials (OSMs) based on complex mixed oxide compositions are capable of selectively and reversibly storing and releasing oxygen in the crystal lattice of the solid phase at medium to high temperatures depending on the change in oxygen partial pressure and temperature (DE 10 2005 034 071 B4). Accordingly, temperature changes and changes in the oxygen partial pressure can be utilized for oxygen enrichment in gases. The targeted change in the oxygen partial pressure is also partially realized through purge gases, such as $CO_2$ or steam (EP 0 913 184 B1), or chemical reactions such as the partial oxidation of hydrocarbons on oxygen-storage material are carried out (U.S. Pat. No. 6,379,586 B1). Up to the present, there has been no reliable data about the energy requirement of the method.

In contrast to the oxygen enrichment method, a closed-cycle hydrogen engine requires pure oxygen because all of the gaseous impurities introduced build up increasingly during operation and lead to increased amount of recirculated gas and of the total pressure in the gas circuit. Therefore, the excess gas amount would have to be bled off from time to time, but the recycled noble gas would also be lost. This noble gas would have to be replenished regularly and, e.g., in vehicles, would also have to be carried along in a pressurized tank. This is not practical. Moreover, an atmospheric nitrogen introduced with the oxygen would lead to the formation of nitric oxides and would form nitrous acid or nitric acid with the condensation water under certain circumstances.

For the reasons stated above, a closed-cycle hydrogen engine must be constructed as a gas-tight engine and operated with a nitrogen-free oxidizer gas.

The most energy-efficient methods so far for generating pure oxygen are based on mixed conductive membranes (WO 2014/161531 A2). The energy requirement for the gas compression for the method is only 0.2 kWh/Nm$^3$ (Kriegel, R., *Sauerstoff-liefernde Keramiken für Verbrennungsprozesse* [oxygen-supplying ceramics for combustion processes]. Gaswärme International 4 (2017) pp. 43 to 48). However, this energy requirement must be covered by the useful work produced by the internal combustion engine so that the increases in efficiency of the closed-cycle hydrogen engine are virtually exhausted. Accordingly, this method for the oxygen supply of a closed-cycle hydrogen engine is also not sensible for economic reasons. The situation is correspondingly aggravated for methods of oxygen supply with a typically higher specific energy consumption.

Further, the cost effectiveness of local energy production is severely impacted by the high investment costs for the oxygen installations, the exhaust gas recycling and the defined mixing of the exhaust gas with oxygen. Therefore, it seems logical that an oxygen operation of reciprocating engines operated with conventional fuels has not been successful up to this point.

SUMMARY OF THE INVENTION

It is the object of the invention to realize an economical local supply of pure oxygen for a closed-cycle hydrogen engine with argon cycling by separating the oxygen from the atmosphere without the useful work generated by the engine having to be employed for this purpose.

This object is met according to the invention in that OSM ceramics and the exhaust gas heat and low oxygen partial pressure of the exhaust gas are used to generate oxygen. At least two reactors filled with OSM ceramics are used, these reactors being alternately purged with exhaust gas and regenerated with air. Losses of inert gases and the entry of atmospheric nitrogen are avoided by intermediate purging with low-pressure steam. The latter is generated by the exhaust heat of the exhaust gas or exhaust air. A mixture of water vapor, inert gas and oxygen is formed during the purging of the reactors. Subsequently, the oxygen content in the gas phase is markedly increased in that the water vapor is condensed out.

If an OSM ceramic is alternately charged (with air) and discharged (purge gas) at approximately constant temperature, an oxygen concentration similar to air can be achieved in the purge gas which is initially free of oxygen.

Although the process of oxygen expansion slows down as the oxygen content increases, the maximum achievable oxygen content in the gas can be approximated. Therefore, with knowledge of the gas throughput, the deliverable oxygen content is also obtained. This is exemplified on the basis of the following equations:

$$H_2(g)+0.5O_2+2Ar \rightarrow H_2O(g)+2Ar \qquad 1.$$

(20 vol % $O_2$ in the oxidizer gas)

$$H_2O(g)+2Ar+OSM(ox.) \rightarrow H_2O+2Ar+0.75O_2+OSM\ (red.) \qquad 2.$$

($\approx$20 vol % $O_2$ in the recycle gas)

$$H_2O(g)+2Ar+0.75O_2 \rightarrow 1H_2O(l)\downarrow+2Ar+0.75O_2(\ )(after\ condensation\ of\ the\ water\ vapor:\ approximately\ 27.3\ vol\ \%\ O_2\ in\ the\ Ar\ or\ in\ the\ recycle\ gas) \qquad 3.$$

The recycle gas is to be equated with the oxidizer gas after the $H_2O$ separation. The process must be carried out in such a way that only the amount of oxygen required for combustion is released. However, the disturbance caused by excess oxygen is negligible; it would likewise be circulated and accordingly brakes the oxygen delivery of the OSM.

Obviously, more oxygen can be produced in the recycle gas in principle in the closed-cycle hydrogen engine than is required for the combustion of a determined amount of hydrogen. However, without regulating the release of oxygen, this would lead to an increase in the system pressure due to a rising oxygen content in the recycle gas. Beyond this, the engine combustion conditions would change. Therefore, a regulation of the oxygen content in the recycle gas is required.

According to the invention, the oxygen content in the recycle gas is adjusted in that the purge time of the respective OSM reactor with the recycle gas varies. A bypass valve is used for this purpose. The bypass valve allows the purge time of the OSM reactors with the recycle gas to be varied freely by bridging the OSM reactors. It is advantageous that a regeneration time deviating from the purge time with recycle gas can be used for the regeneration of the OSM reactors with air. This ensures that the OSM ceramic will always be sufficiently loaded with oxygen.

BRIEF DESCRIPTION OF THE DRAWINGS

In the following, the invention will be described in more detail referring to an embodiment example with the aid of a drawing. The drawing shows:

FIG. 1 a functional diagram for illustrating the method according to the invention.

DETAILED DESCRIPTION OF THE DRAWINGS

The method for the oxygen supply of a closed-cycle hydrogen engine 1 with fuel performance of 100 kW is shown schematically in FIG. 1. The exhaust gas of the closed-cycle hydrogen engine 1 is fed directly via a switchover valve to a first reactor 4 which is filled with an OSM ceramic. A mixed oxide with the composition $Ca_{0.5}Sr_{0.5}Fe_{0.5}Mn_{0.5}O_{3-\delta}$ which was synthesized from the individual oxides and carbonates by solid state reaction is used as OSM ceramic. A mixture is prepared with 25 vol % of an organic pore forming agent, plasticized with the addition of organic binders and floating agents and extruded to form thin rods with a diameter of approximately 2 mm. The extrudates are sintered at 1420° C. for 4 hours and then broken into pieces of 1 to 3 cm length. The first reactor 4 and a second reactor 5 are filled in each instance with 15 kg of the granulate with an open porosity of 27 to 30 vol %. When the first reactor 4 is purged with the recycle gas for 20 seconds, approximately 100 standard liters of oxygen are released from the OSM ceramic due to the low oxygen partial pressure of the hydrogen/argon mixture and the rising temperature in the first reactor 4. During the purging in the first reactor 4, the OSM ceramic is regenerated in the second reactor 5 to which air is fed via a further switchover valve 3. The recycle gas which is enriched with the oxygen in the first reactor 4 is guided via the further switchover valve 3 and from the latter via an outgoing collection line for recycle gas 6 through a first heat exchanger 15 of a low-pressure steam generator 8 in which a portion of the exhaust gas heat is used to generate steam (<110° C., <0.5 bar).

Further, the low-pressure steam generator 8 can be heated via a separate further heat exchanger 16 with the oxygen-depleted exhaust air which is alternately guided from the second reactor 5 or from the first reactor 4 via the collection line for exhaust air 7. After passing through the first heat exchanger 15 of the low-pressure steam generator 8, the gas mixture of the collection line for recycle gas 6 comprising water vapor, argon and oxygen is subsequently guided through an air-cooled condenser 9 so that the water vapor is condensed out. The liquid water is introduced in the liquid phase of the low-pressure steam generator 8, and accumulating excess water is let off via an overflow. The recycle gas comprising argon and oxygen is stored intermediately in a membrane gas storage 12 at approximately atmospheric pressure and is guided back again from the latter to the closed-cycle hydrogen engine 1. The membrane gas storage 12 serves to improve homogenization of the recycle gas, since fluctuating oxygen contents can occur therein. The oxygen partial pressure in the membrane gas storage 12 is constantly monitored by an oxygen sensor 14 and moved to the preadjusted desired value in that the purge time with recycle gas is increased in the first reactor 4 and/or second reactor 5 when the oxygen content is too low and decreased when the oxygen content is too high. The membrane gas storage 12 also serves for restarting the system after stoppage without external gas supply.

In order that no argon is lost when the feed of recycle gas to the first reactor 4 is switched to the second reactor 5 or when the feed of recycle gas to the second reactor 5 is switched to the first reactor 4, low-pressure steam is metered into the recycle gas at the end of the purge process, i.e., shortly before switching over, via a steam metering valve for recycle gas 10 which is connected on the input side to the low-pressure steam generator 8, so that residual gas remaining in the first reactor 4 or second reactor 5 is flushed out with low-pressure steam into the collection line for recycle gas 6. At the same time, the second reactor 5 or first reactor 4 in the regeneration cycle with air is purged with low-pressure steam at the end of the cycle via a valve for fresh air 11 connected on the input side to the low-pressure steam generator 8 in order to remove the residual air from the second reactor 5 or first reactor 4 in the collection line for exhaust air 7 so that no extraneous gases or residual air remains in the second reactor 5 or first reactor 4 or subsequently reaches the recycle gas. After this phase of purging with low-pressure steam, the two switchover valves 2 and 3 are switched simultaneously so that the supply of recycle gas is diverted from the first reactor 4 to the second reactor 5 or from the second reactor 5 to the first reactor 4, and the air feed from the second reactor 5 to the first reactor 4 or from the first reactor 4 to the second reactor 5 is carried out simultaneously.

As has already been mentioned above, more oxygen can be generated in the recycle gas than is required for the combustion of a determined amount of hydrogen. The oxygen content in the recycle gas is adjusted in a simple manner by varying the purge time of the first reactor 4 or of the second reactor 5 with the recycle gas. A bypass valve 13 is used for this purpose and allows the purge time of the first reactor 4 or of the second reactor 5 with the recycle gas to be varied at will. It is advantageous that a regeneration time deviating from the purge time with recycle gas can be used for the regeneration of the second reactor 5 or first reactor 4 with air. In this way, it can be ensured that the OSM ceramic is sufficiently loaded with oxygen.

REFERENCE NUMERALS 1 closed-cycle hydrogen engine
2 switchover valve
3 further switchover valve
4 first reactor with OSM bed
5 second reactor with OSM bed
6 collection line for recycle gas
7 collection line for exhaust air
8 low-pressure steam generator
9 condenser
10 steam metering valve for recycle gas
11 valve for fresh air
12 membrane gas storage
13 bypass valve
14 oxygen sensor
15 first heat exchanger
16 further heat exchanger

The invention claimed is:

1. A method for operating a closed-cycle hydrogen engine with an oxidizer gas comprising oxygen and an inert gas not participating in the combustion, the method comprising:
cycling a gas mixture, and separating a combustion-product water by condensing out, by performing the steps of:
alternatingly operating, in two phases, at least two reactors, each filled with oxygen-storage material to obtain oxygen needed for combustion directly from air surrounding the closed-cycle hydrogen engine, including:
in a first phase, filling the at least two reactors with air so that oxygen contained in the air is stored in the oxygen-storage material, and
in a second phase purging the at least two reactors which were enriched with the oxygen in the oxygen-storage material with the gas mixture expelled from the combustion engine so that the gas mixture is enriched with the oxygen stored in the oxygen-storage material;
separating water from the oxygen-enriched gas mixture resulting from the second phase by condensing the water out to produce the oxidizer gas containing the oxygen and the inert gas;
supplying the oxidizer gas to the closed-cycle hydrogen engine.

2. The method according to claim 1, wherein an OSM ceramic with a composition $Ca_{0.5}Sr_{0.5}Fe_{0.5}Mn_{0.5}O_3$ synthesized from individual oxides and carbonates by solid state reaction is used.

3. The method according to claim 1, wherein any desired purge time of the at least two reactors is adjustable by a bypass valve and the oxygen to be stored in the oxygen-storage material is accordingly adjustable in any desired manner.

4. The method according to claim 1, wherein the gas mixture supplied for cycling after the second phase has an exhaust gas heat which is utilized for generating low-pressure steam.

5. The method according to claim 1, wherein an oxygen-depleted air results in the first phase and has a heat which is utilized for generating low-pressure steam.

6. The method according to claim 1, wherein a membrane gas storage for storing the oxidizer gas is contained in the circuit and serves to homogenize a mixture of the oxidizer gas and enables a reliable starting of the closed-cycle hydrogen engine.

7. The method according to claim 1, further comprising using switchover valves for switching between the first and second phases, inputs to the at least two reactors are arranged upstream of the at least two reactors and outputs of the at least two reactors are arranged downstream of the at least two reactors, wherein the inputs and outputs of the at least two reactors during the first phase are switched to outputs and inputs of the at least two reactors in the second phase.

8. The method according to claim 1, wherein losses of inert gas and entry of atmospheric nitrogen are prevented by an intermediate purge with low-pressure steam.

\* \* \* \* \*